United States Patent [19]
Proctor

[11] Patent Number: 5,984,421
[45] Date of Patent: Nov. 16, 1999

[54] VEHICLE WHEEL RIM

[75] Inventor: John Stephen Proctor, Worcestershire, United Kingdom

[73] Assignee: Steel Wheels Limited, Worcestershire, United Kingdom

[21] Appl. No.: 09/011,597

[22] PCT Filed: Aug. 12, 1996

[86] PCT No.: PCT/GB96/01962

§ 371 Date: Apr. 6, 1998

§ 102(e) Date: Apr. 6, 1998

[87] PCT Pub. No.: WO97/06964

PCT Pub. Date: Feb. 27, 1997

[30] Foreign Application Priority Data

Aug. 16, 1995 [GB] United Kingdom ............... 9516796

[51] Int. Cl.⁶ .......................................... B60B 5/00
[52] U.S. Cl. .......................... 301/23; 152/409; 152/410; 152/DIG. 10; 152/401; 301/35.3; 301/35.51; 301/95; 301/96; 301/97; 301/98; 403/313; 403/309
[58] Field of Search ..................... 152/409, 410, 152/DIG. 10, 401; 301/35.3, 35.51, 23, 95, 96, 97, 98; 403/313, 309

[56] References Cited

U.S. PATENT DOCUMENTS

| | | | |
|---|---|---|---|
| 1,710,614 | 4/1929 | Furrer | 152/410 |
| 2,548,627 | 4/1951 | Sinclair | 152/410 |
| 3,106,237 | 10/1963 | Homes, Jr. | 152/410 |
| 3,224,484 | 12/1965 | Smith | 152/410 |
| 3,599,697 | 8/1971 | Gerbeth | 152/410 |
| 4,144,922 | 3/1979 | Strader | 152/410 |
| 4,209,052 | 6/1980 | French | 152/410 |
| 4,721,142 | 1/1988 | Foster | 152/410 |
| 5,107,914 | 4/1992 | Yamoto et al. | 152/409 |

FOREIGN PATENT DOCUMENTS

| | | |
|---|---|---|
| 0 114 782 | 1/1984 | European Pat. Off. . |
| 0 238 786 | 1/1987 | European Pat. Off. . |
| 1256494 | 5/1960 | France ............... 152/DIG. 10 |
| 82 05015 | 3/1982 | France . |
| D. 24.740 | 5/1967 | Luxembourg . |
| 2 223 989 | 4/1990 | United Kingdom . |
| 2 261 857 | 6/1993 | United Kingdom . |
| WO 83/03228 | 9/1983 | WIPO . |

*Primary Examiner*—D. Glenn Dayoan
*Attorney, Agent, or Firm*—Wells, St. John, Roberts, Gregory & Matkin, P.S.

[57] ABSTRACT

A vehicle wheel rim has a rim base (1) carrying a pair of bead-retaining flanges (2, 4), one of which is on a bead seat ring (5) releasably retained, in use, on the rim base (1) by a locking ring (6) engaging in a groove (7) formed in a gutter section (3) of the rim base. The locking ring is shaped so as to cooperate with formations (5A, 9), respectively in the bead ring (5) and rim base (1) to provide a positive lock limiting relative rotation between the bead seat ring and rim base.

9 Claims, 1 Drawing Sheet

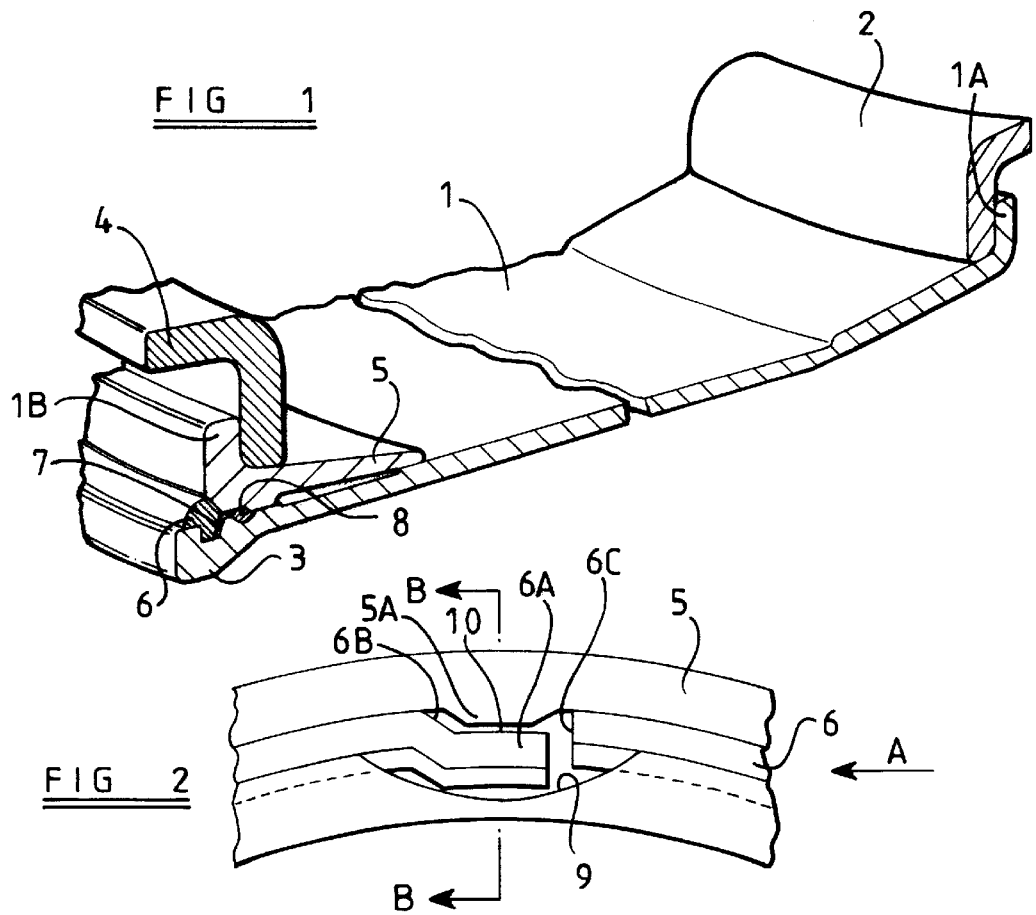
FIG 1
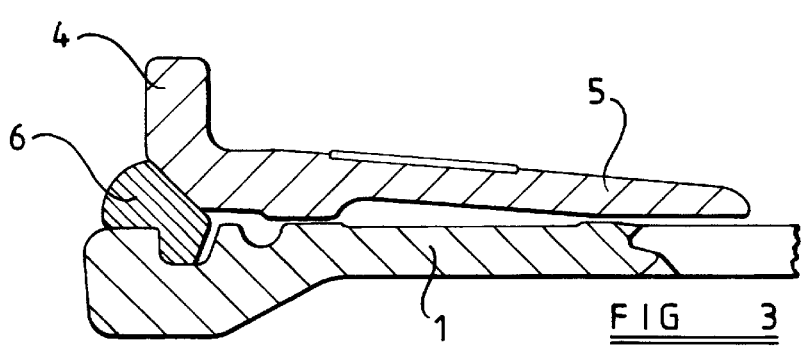
FIG 2
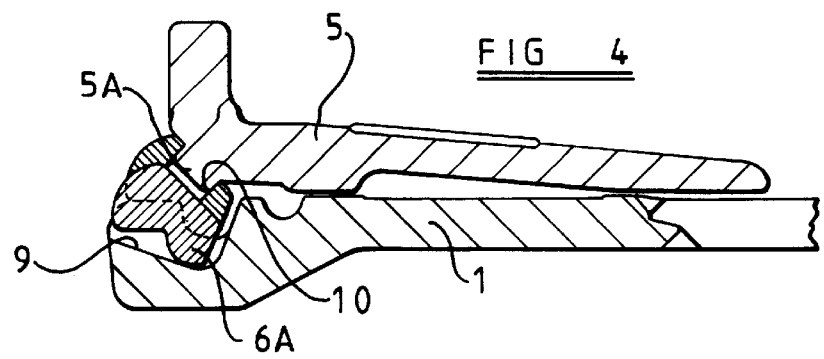
FIG 3
FIG 4

VEHICLE WHEEL RIM

This invention relates to a vehicle wheel rim, primarily for heavy off-highway vehicles such as earth movers and of the general kind having a rim base carrying a pair of bead retaining flanges, one of which is on or incorporated in a separate bead seat ring releasably retained, in use, on the rim base by a locking ring engaging a formation provided on the rim base.

Relative movement between the bead seat ring and rim base can lead to the tire and/or wheel, and possibly the associated power transmission assembly also, being damaged. It is therefore common practice for a wheel of this kind to incorporate a locking arrangement to prevent such relative movement. Some known locking arrangements include cooperating parts welded respectively to the rim base and bead seat ring and interlocked, in use, by a keying device. Other arrangements employ a key clamped or welded to the locking ring and engaging both the bead seat ring and rim base via suitable formations to prevent the aforesaid relative rotation. All of these prior arrangements can fail under high stress, usually by weld fracture and/or loosening of clamps, and with the increasing use of modern high power vehicle transmissions this problem is becoming more pronounced.

An object of the present invention is to provide a vehicle wheel rim which is more resistant to high stress failure than some conventional devices.

According to the invention, the locking ring is shaped so as to cooperate with formations respectively in the bead seat ring and rim base to provide a positive lock limiting relative rotation between the bead seat ring and rim base.

Preferably, the locking ring is shaped to engage a recess formed in the rim base and is itself engaged in locking relationship by a protrusion formed on the bead seat ring. The locking conveniently takes place within the outer diameter of the locking ring.

Typically, a single shaped portion of the locking ring cooperates with formations respectively on the rim base and bead seat.

The invention will now be described, by way of example, with reference to the accompanying drawings in which:

FIG. 1 is a part-sectional perspective view of part of one form of a vehicle wheel of the invention;

FIG. 2 is a partly cut-away fragmentary view of a part of the wheel of FIG. 1;

FIG. 3 is a transverse cross-sectional view of FIG. 2 in the direction of arrow A of FIG. 2, and FIG. 4 is a cross-section along the line B—B of FIG. 2.

Referring first to FIG. 1, the wheel rim illustrated therein includes an annular rim base 1 having a lateral support flange 1A around one peripheral extremity thereof for a separate tire bead retaining flange 2, the opposite peripheral extremity being provided with a thickened gutter section 3. A further lateral support flange 1B is formed on a separate component, in the form of a bead seat ring 5, and is engaged by a separate tire bead retaining flange 4. The bead seat ring is retained on the rim base by a locking ring 6 engaged in a groove in a gutter 7 formed in the gutter section 3 of the rim base. A sealing ring 8 is trapped between the bead seat ring and rim base to prevent leakage of air past the ring when a tubular tire (not shown) is mounted on the wheel rim, in use.

As can be seen more clearly from FIG. 2, the locking ring 6 is split transversely, as is conventional, but, in accordance with the invention, one end portion 6A is shaped to extend radially inwardly into engagement with a pocket or recess 9 formed in the gutter 7 or rim base 1. Shaping of the end portion 6A may be effected by deformation, typically by hot or cold working, or by machining or by a combination of deformation and machining. The pocket or recess 9 may also be produced by deformation, again typically by cold or hot forming or possibly by machining or both. The locking ring is thereby keyed to the rim base in such a manner as to limit rotational relative movement between itself and the rim base. In order to key the bead seat ring 5 itself to the locking ring, the bead seat ring is provided with a radially inwardly directed projection 5A, formed by hot or cold working, or alternatively by machining or weldment, the projection 5A locating within a recess 10 formed in the upper region of the locking ring by the aforesaid shaping of the end portion of the latter.

Rotational movement of the bead seat ring relative to the locking ring in one direction is limited by an adjacent intermediate surface 6B of the locking ring located inwardly along the deformed end portion thereof and in the other direction by the end surface 6C of the adjacent undeformed other end portion of the locking ring. It will be seen that the maximum relative rotation that can occur between the bead seat ring and the rim base is the total clearance between the deformed locking ring portion 6A and the recess 9 and the clearance between the projection 5A and surfaces 6B, 6C. These clearances can be engineered so as to be practically insignificant, so that there is substantially no possibility of significant relative rotation taking place between the three wheel components, even under the highest expected operating forces.

It will be seen that the arrangement of the invention provides a positive keying action between the three components of the wheel, thereby eliminating reliance upon friction forces and avoiding the use of separate locking parts which would require welding or clamping to the main wheel structure. The invention thus provides an exceptionally robust locking arrangement which greatly reduces the possibility of component failure as compared with some conventional welded locking arrangements. It also has the advantage that locking is achieved using only the three basic wheel components, i.e. rim base, bead seat ring and locking ring.

A further advantage of the wheel rim of this invention is that if the relative orientations of the three assembled components are incorrect, the bead seat will be prevented from sealing engagement with the rubber seal and it will not then be possible to inflate the tire. Moreover, any attempt to fit the deformed lock ring and/or bead seat ring to a rim base not having a corresponding formation will again preclude inflation of the tire. The invention thus provides a considerable degree of in-built security.

It will be understood that the arrangement of the invention may take different forms. For example, it will be possible to deform both of the adjacent end portions of the locking ring into a single or respective recesses and the deformation of the ring, whether using one end portion or both, may be radially outwards into a recess formed in the bead seat. The locking formation on the rim base would then be a radially outward projection for engagement with the locking ring, although such a projection, at least in the arrangement described above, would not extend outwardly of the gutter, since otherwise assembly of the bead seat on to the rim base could be compromised. In a further alternative, when both ends of the locking ring are deformed into locking formations, it would be possible for one to be radially inwardly deformed into a recess in the rim base and the other radially outwardly deformed into a recess in the bead seat.

It would also be possible to carry out the invention by shaping one or more portions of the locking ring at intermediate locations remote from its ends, in addition to or instead of the shaping of the end portion(s) of the ring illustrated in the drawings and described above, the rim base and bead seat ring then being deformed or otherwise treated in a complementary manner at appropriate locations to provide a positive lock between the three components. The ring shaping at an intermediate location may again be radially inwardly or outwardly, or, if more than one such shaped portion is provided, one or more of them may have a different radial orientation from one or more of the others, the locking part of the rim base and bead seat ring being oriented accordingly. Again, any outwardly projecting formation of the rim base would not exceed the gutter outside diameter for the reason mentioned above.

I claim:

1. A vehicle wheel rim comprising a rim base carrying a pair of bead retaining flanges, one of the flanges being on a separate bead seat ring which is releasably retained, in use, on the rim base by a locking ring engaging a formation provided on the rim base, the locking ring being shaped to provide an integral formation arranged so as to cooperate, in use, with formations respectively in the bead seat ring and rim base to provide a positive lock limiting relative rotation between the bead seat ring and the rim base.

2. A wheel rim according to claim 1, wherein the shaping of the locking ring is produced by deformation thereof.

3. A wheel rim according to claim 1, wherein the locking ring is shaped to engage a recess formed in the rim base and is itself engaged in locking relationship by a protrusion formed on the bead seat ring.

4. A wheel rim according to claim 1, wherein the locking conveniently takes place within the outer diameter of the locking ring.

5. A wheel rim according to claim 1, wherein a single shaped portion of the locking ring cooperates with formations respectively on the rim base and bead seat.

6. A wheel rim according to claim 1, wherein the locking ring is transversely split and one of the adjacent end portions is shaped to form a radially inwardly extending portion for locking engagement in a recess formed in the rim base.

7. A wheel rim comprising a rim base carrying a pair of bead retaining flanges, one of the flanges being on a separate bead seat ring which is releasably retained, in use, on the rim base, the locking ring being shaped so as to cooperate with formations respectively in the bead seat ring and rim base to provide a positive lock limiting rotation between the bead seat ring and the rim base, wherein:

the locking ring is transversely split and one of the adjacent end portions is shaped to form a radially inwardly extending portion for locking engagement in a recess formed in the rim base; and rotational movement of the bead seat ring relative to the locking ring in one direction is limited by an intermediate surface of the locking ring located inwardly along the shaped end portion thereof and in the other direction by the end surface of the adjacent undeformed other end portion of the locking ring.

8. A wheel rim according to claim 7, wherein the locking ring is in locking engagement with the rim base and bead seat ring within the outer diameter of the locking ring.

9. A wheel rim according to claim 7, wherein the locking ring is shaped to provide a single formation which cooperates with formations respectively on the rim base and bead seat ring.

* * * * *